US011690385B2

(12) United States Patent
Weakley et al.

(10) Patent No.: US 11,690,385 B2
(45) Date of Patent: *Jul. 4, 2023

(54) HIGH FAT FEED PARTICLES

(71) Applicant: PURINA ANIMAL NUTRITION LLC, Shoreview, MN (US)

(72) Inventors: David C. Weakley, Pacific, MO (US); Kent J. Lanter, Waterloo, IL (US)

(73) Assignee: Purina Animal Nutrition LLC, Arden Hills, MN (US)

( * ) Notice: Subject to any disclaimer, the term of this patent is extended or adjusted under 35 U.S.C. 154(b) by 607 days.

This patent is subject to a terminal disclaimer.

(21) Appl. No.: 16/213,903

(22) Filed: Dec. 7, 2018

(65) Prior Publication Data

US 2019/0104752 A1 Apr. 11, 2019

Related U.S. Application Data

(63) Continuation of application No. 12/822,376, filed on Jun. 24, 2010, now Pat. No. 10,172,370.

(60) Provisional application No. 61/220,250, filed on Jun. 25, 2009, provisional application No. 61/219,905, filed on Jun. 24, 2009.

(51) Int. Cl.
*A23D 9/00* (2006.01)
*A23K 40/25* (2016.01)
*A23K 40/20* (2016.01)
*A23K 20/158* (2016.01)
*A23K 50/10* (2016.01)

(52) U.S. Cl.
CPC .............. *A23D 9/00* (2013.01); *A23K 20/158* (2016.05); *A23K 40/20* (2016.05); *A23K 40/25* (2016.05); *A23K 50/10* (2016.05)

(58) Field of Classification Search
CPC .......... A23D 9/00; A23K 50/10; A23K 40/20; A23K 20/158; A23K 40/25
See application file for complete search history.

(56) References Cited

U.S. PATENT DOCUMENTS

| 2,278,476 | A | 4/1942 | Albert |
|---|---|---|---|
| 3,467,525 | A | 9/1969 | Hale et al. |
| 3,496,858 | A | 2/1970 | Jenkins |
| 3,993,796 | A | 11/1976 | Steinke |
| 4,542,031 | A | 9/1985 | Nakajima et al. |
| 4,861,606 | A | 8/1989 | Jensen |
| 4,971,820 | A | 11/1990 | Likuski et al. |
| 5,120,565 | A | 6/1992 | Lanter et al. |
| 5,227,190 | A | 7/1993 | Ward |
| 5,587,193 | A | 12/1996 | Kazemzadeh |
| 5,683,739 | A | 11/1997 | Lanter et al. |
| 5,716,655 | A | 2/1998 | Hamstra et al. |
| 5,783,240 | A | 7/1998 | Wenger et al. |
| 6,083,520 | A | 7/2000 | Toneby |
| 6,136,353 | A | 10/2000 | Munz |
| 6,245,366 | B1 | 6/2001 | Popplewell et al. |
| 6,440,447 | B1 | 8/2002 | Luhman |
| 6,440,477 | B2 | 8/2002 | Nishioka et al. |
| 6,517,903 | B1 | 2/2003 | Schmidt |
| 7,001,636 | B1 | 2/2006 | Oddsen et al. |
| 10,172,370 | B2 | 1/2019 | Weakley et al. |
| 2003/0059494 | A1 | 3/2003 | Ang et al. |
| 2003/0118690 | A1 | 6/2003 | Bartle et al. |
| 2003/0170371 | A1 | 9/2003 | Jobe et al. |
| 2003/0211221 | A1 | 11/2003 | Abril et al. |
| 2003/0215547 | A1* | 11/2003 | Leyh, Jr. .................. A23P 20/12 426/98 |
| 2005/0123642 | A1 | 6/2005 | Hjermitslev et al. |
| 2006/0045957 | A1 | 3/2006 | Bevans et al. |
| 2006/0127537 | A1 | 6/2006 | Lewis |
| 2009/0162455 | A1 | 6/2009 | Koppe et al. |

FOREIGN PATENT DOCUMENTS

| CA | 2142953 A1 | 8/1995 |
|---|---|---|
| GB | 2324701 A | 11/1998 |
| KR | 1994001336 A | 7/1994 |
| WO | 9414335 A1 | 7/1994 |

OTHER PUBLICATIONS

Kanagaratnam et al Palm-Based Trans Fatty Acid-Free Butter Oil Substitute Jun. 2009 http://www.palmoilworld.org/PDFs/FOOD/8_TT-435_Food.pdf (Year: 2009).*
Babji et al Replacement of animal fat with fractionated and partially hydrogenated palm oil in beef burgers Jan. 1998 https://www.researchgate.net/publication/283008266_Replacement_of_animal_fat_with_fractionated_and_partially_hydrogenated_palm_oil_in_beef_burgers (Year: 1998).*
Donovan, D C. et al., "Influence of Dietary Fish Oil on Conjugated Linoleic Acid and Other Fatty Acids in Milk Fat from Lactating Dairy Cows", J Dairy Sci vol. 83, 2000, pp. 2620-2628.
Hutjens, Michael F., "Strategies for Feeding Fat to Dairy Cattle", Illini DairyNet Papers; University of Illinois Extension, Aug. 5, 1998, 6 pages.
Keady, Timothy W. et al., "Effects of supplementation of dairy cattle with fish oil on silage intake, milk yield and milk composition", Journal of Dairy Research, vol. 67, 2000, pp. 137-153.
Lacasse, Pierre et al., "Addition of protected and unprotected fish oil to diets for dairy cows. I. Effects on the yield, composition and taste of milk", Journal of Dairy Research, vol. 69, 2002, pp. 511-520.
PCT, "International Preliminary Reporton Patentability", Application No. PCT/US2010/039754, dated Jan. 4, 2012, 5 pages.
PCT, "International Search Report", Application No. PCT/US2010/039754, dated Jan. 17, 2011, 7 pages.
Staples, Charles R. et al., "Milk Fat Depression in Dairy Cows—Influence of Supplemental Fats", Department of Animal Sciences, University of Florida; Florida Ruminant Nutrition Symposium, Feb. 2, 2006, 17 pages.

(Continued)

*Primary Examiner* — Vera Stulii
(74) *Attorney, Agent, or Firm* — Dorsey & Whitney LLP

(57) ABSTRACT

The present invention includes extruded livestock feed particles comprising a high level of fat and methods of making these animal feed particles. The particles are palatable and digestible by the livestock animals and lead to an enhanced energy intake by the animals. The particles are also flowable. The method includes the use of a vacuum coater to incorporate the fat into extruded animal feed particles. The present invention also includes methods of feeding dairy cows.

14 Claims, 4 Drawing Sheets

(56) References Cited

OTHER PUBLICATIONS

Whitlock, L A. et al., "Fish Oil and Extruded Soybeans Fed in Combination Increase Conjugated Linoleic Acids in Milk of Dairy Cows More Than When Fed Separately", J. Dairy Sci. vol. 85; American Dairy Science Association, 2002, pp. 234-243.

Whitlock, L A. et al., "Milk Production and Composition from Cows Fed Small Amounts of Fish Oil with Extruded Soybeans", J. Dairy Sci. vol. 89; American Dairy Science Association, 2006, pp. 3972-3980.

* cited by examiner

HIGH FAT FEED PARTICLES

CROSS REFERENCE TO RELATED APPLICATION

The present application is a continuation of U.S. patent application Ser. No. 12/822,376, filed Jun. 24, 2010, issued as U.S. Pat. No. 10,172,370 on Jan. 8, 2019, which claims the benefit of U.S. provisional patent application No. 61/219,905, filed Jun. 24, 2009 and U.S. provisional patent application No. 61/220,250, filed Jun. 25, 2009, the contents of each of which is hereby incorporated by reference in their entireties.

BACKGROUND OF THE INVENTION

Fat is a desirable component of most animal diets, and the art is replete with methods of introducing it into the diets of various livestock. In addition to serving as an energy source, fat can have an impact on the quality and quantity of milk production in dairy animals and meat production of animals raised for slaughter, e.g. various ruminants, pigs and poultry.

Animal feed particles are generally a convenient form for use in supplementing pelleted livestock feed with, for example, additional fat and can be made using extrusion methods. In extrusion, desired ingredients to be incorporated into the feed may be mixed, cooked, sheared, gelatinized, formed and chopped into particles. The particles may also be subjected to additional coating after extrusion. Fat, for example, may be applied after the forming process by spray drums or mixers. With respect to fat, there have been limits to the amount of fat that can be incorporated prior to extrusion and also after extrusion. Incorporation of high amounts of fat results in undesirable crumbling while similar amounts applied onto the surface of the pellet or nugget produces a product that is soft, friable and has a greasy texture. The amount and type of fat can also affect the palatability of the feed particles and lead to decreased intake. Inappropriate amount and types of fat can also affect the digestibility and lead to sick cows. Dairy cows, for example, have been fed extruded particles with about 40% beef tallow. These feed particles will be referred to herein as "40% fat particles".

Other methods to increase the fat content include a process of applying fat containing liquid to a granulated product by combining the fat containing liquid and the granulated product and generating a negative pressure in the container and then slowly releasing the negative pressure while mixing the granulated product moistened with the fat containing liquid. This method results in conveying some of the fat containing liquid into the product; however, the absorptivity of fat by the product was still relatively small.

SUMMARY OF THE INVENTION

In one aspect, the present invention includes extruded livestock animal feed comprising extruded particles with a fat content of at least about 45 percent by weight wherein the feed particles are palatable, digestible and provide the livestock animal with enhanced energy intake. The extruded particles may comprise two different fats, a low melting point fat, a high melting point fat or a combination of both.

In another aspect, the present invention includes a method of making animal feed particles for livestock comprising mixing and conditioning fat particle ingredients comprising nutritional components and additives to form a mixture. The method also includes extruding the mixture to form extruded particles, placing a low melting point fat into a vacuum coater under vacuum wherein the vacuum coater contains extruded particles such that the low melting point fat permeates into the extruded particles when the vacuum is partially released. The method further includes adding a high melting point fat to the vacuum coater after the low melting point fat saturates the extruded particles and releasing the remaining vacuum to generate livestock feed particles comprising at least 45 percent fat by weight, wherein the particles are palatable, digestible and provide enhanced energy intake for the livestock.

In a further aspect, the present invention includes a method of feeding dairy cows comprising feeding extruded feed particles wherein the particles comprise at least about 45 percent fat by weight and wherein the particles are palatable and digestible and provide the livestock with enhanced energy intake.

DETAILED DESCRIPTION OF ILLUSTRATIVE EMBODIMENTS

Figure 1:
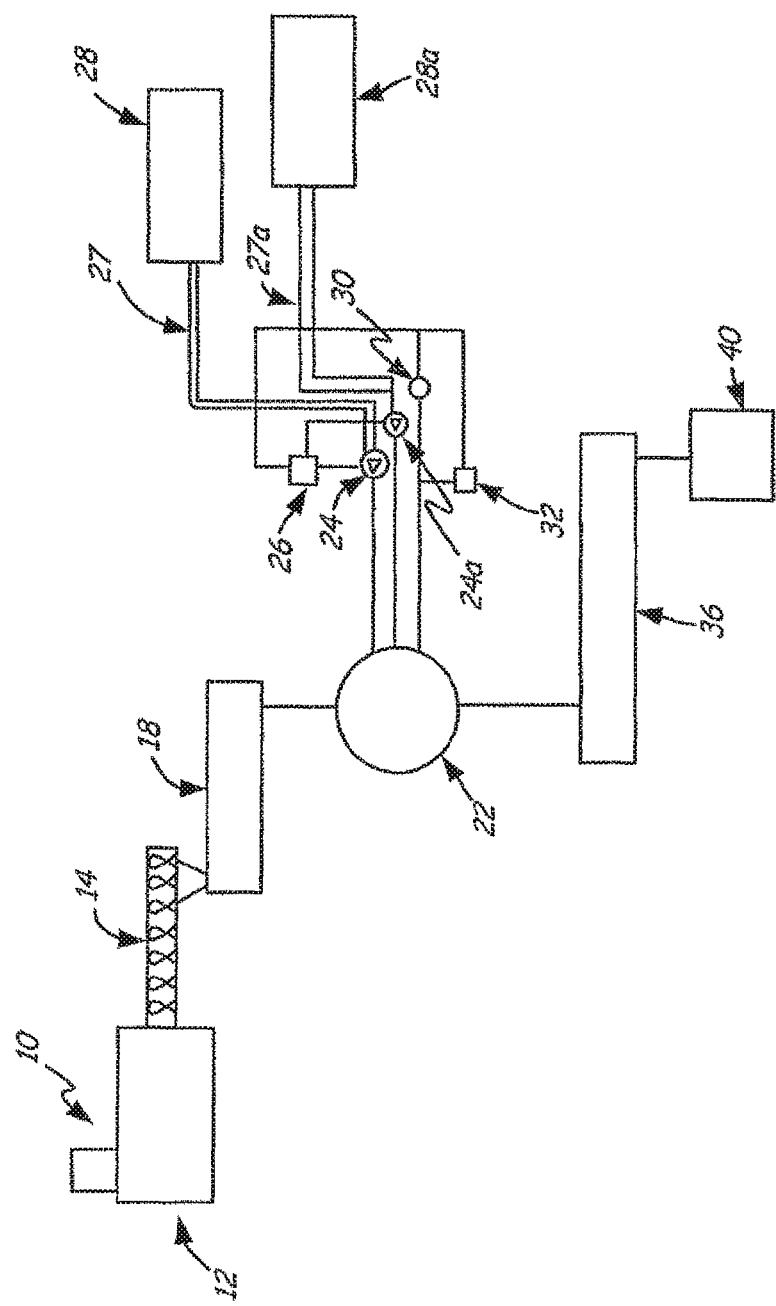
FIG. 1 is a schematic view of an arrangement for performing the process according to the invention.

The present disclosure includes extruded animal feed particles, in particular feed particles for livestock and methods of making the feed particles comprising a high level of fat. The feed particles described herein advantageously have higher fat content than prior art feed particles while maintaining fat digestibility and palatability. The feed particles thus, lead to an enhanced energy intake by the livestock. Furthermore, the feed particles for livestock, even with the high levels of fat, are advantageously dry on the exterior enabling flowability of the particles.

The extruded feed particles of this disclosure generally include a high fat content. The fat included in the particles may include more than one fat source and preferably includes a fat with a high melting point. In some preferred embodiments, a combination of at least two fats are used, one with a low melting point that is generally in the interior of the particles and one with a higher melting point that is generally in the outer section of the particles and/or the exterior of the particles. The feed particles are preferably extruded livestock feed particles supplemented advantageously with fat(s) as described herein while maintaining palatability and digestibility.

The present invention includes methods of making feed particles for livestock animals with a high fat content. These feed particles advantageously provide increased metabolizable energy while maintaining fat digestibility and palatability. The method includes mixing the particle ingredients to form a mixture, conditioning the mixture prior to extrusion, extruding feed particles and placing extruded particles into a vacuum coater to incorporate additional fat into the extruded particles. A low melting point fat is added into a vacuum coater followed by partial release of the vacuum to allow the low melting point fat to enter into the particles. The low melting point is generally in the interior of the particles. A high melting point fat can then be introduced into the vacuum coater and the remaining vacuum released. Some of the high melting point fat can enter the outer region of the particles but, more importantly, the high melting point fat is generally on the exterior and forms a coating on the exterior of the particles that hardens at ambient temperature. The coated extruded particles formed in this manner contain a high amount of fat. The combination of a low melting point fat interior and a high melting point fat outer section and exterior allows the animal feed particles to be loaded with high amounts of fat while maintaining the integrity, digestibility and palatability of the animal feed particles in addition to good flowability.

The feed particles of the present invention can be provided as daily feed ration for a variety of livestock animals. The livestock animals can include domesticated animals such as beef cattle, dairy cows, sheep, goats, deer, horses and the like. Zoo animals may also be provided the particles described herein. Livestock animals are generally fed daily feed rations that include pelleted and/or extruded particles.

The extruded feed particles of the present invention include fat, nutritional components and other additives. Nutritional components can include starch and protein components. Other additives can include, for example, amino acids, vitamins, minerals, nutraceuticals, pharmaceuticals and the like. During formation of the particles, the additives may be added into the nutritional components or they may be added to the fat component.

The animal feed particles of the present invention include a high amount of fat. The total fat content in the animal feed particles is at least about 45 percent by weight. In preferred embodiments, the fat content in the animal feed particles is between about 50 percent by weight and about 55 percent by weight. Fat content of animal feed particles greater than about 55 percent by weight is also within the scope of this invention.

The feed particles of the present invention are advantageously palatable to the animals with the high amount of fat. The livestock animals generally eat about the same amount or greater of the high fat feed particles described herein when compared to the 40% fat particles. The amount of the feed intake is not adversely affected by the increased amount of fat in the particles nor by the type of fat, for example the high melting point fat, incorporated into the feed particles. In embodiments with dairy cattle feed, for example, the thy matter intake in the dairy cattle is maintained at least about 50 pounds per day, preferably at least about 55 pounds per day and more preferably at least about 60 pounds per day.

The feed particles of the present invention are also advantageously digestible. Generally, if a particular fat is not digestible or the amount of fat is excessive, the animal's health deteriorates and can lead to symptoms such as diarrhea. Digestibility as described herein is consumption of the feed particles, followed by breakdown in and absorption from the gastrointestinal tract, without any ill effects such as diarrhea in animals. In exemplary dairy cow embodiments, digestibility is preferably, maintained or improved when the fat ingestion by the dairy cows from the feed particles is at least about 1.2 pounds per day and more preferably, at least about 1.5 pounds per day.

The animal feed particles described herein advantageously have a higher density of fat while maintaining digestibility and palatability, thus the animals are provided with enhanced energy intake. Generally, energy intake into an animal can be increased by increasing the amount of intake, increasing the energy content of the food, increasing the digestibility of the particles or a combination of these parameters. Without being bound by any theory, the feed particles described herein may provide enhanced energy intake due to the increased fat and thus, energy content within the particles. This increased energy content in the particles generally does not negatively impact either the digestibility or the palatability of the particles, thus the animals are provided with increased energy content without detrimental effects. However, it may also be the case that enhanced energy intake may be due to not only the energy content of the particles but also due to a combination of the parameters stated above. Regardless of the specific mechanisms by which it occurs, it is advantageous that the feed particles described herein provide enhanced energy intake for the animals.

Enhanced energy intake can be, for example, at least about a 3 percent increase in the intake of metabolizable energy compared to pelleted feed without any added fat particles. Preferably, the increase in the intake of metabolizable energy is at least about 4 percent compared to the pelleted feed without any added fat particles. These percentage increases are based on a 50 pound dry matter intake. The percentage increases may be greater if the amount of dry matter intake is greater. All of these increases are within the scope of this invention.

The animal feed particles of the present invention can generally provide an animal with at least about 0.3 pounds of fat per pound of dry matter intake. In an exemplary embodiment, if the animal consumes about 50 pounds of dry matter, then the animal can ingest about 1.5 pounds per fat. However, if the animal were to ingest 60 pounds of dry matter, then the fat intake would increase to about 1.8 pounds per day. Animal feed particles that provide more than 0.3 pounds of fat per pound of dry matter intake are also within the scope of the invention and thus can provide greater fat intake per day.

The animal feed particles of the present invention include nutritional components. The nutritional components can include starch and protein components. Generally, the nutritional components and the additives make up the remaining weight of the particle after taking into account the weight percentage of the fat. For example, if the fat content is about 50 percent by weight then the remaining 50 percent by weight includes the nutritional components and any additives. The nutritional components can be about 55 percent by weight or less of the particles. Preferably, the nutritional components includes between about 50 percent by weight and about 45 percent by weight of the feed particles. Nutritional components content of the animal feed particles less than about 45 percent by weight are also within the scope of this invention.

The particles generally comprise a substantial amount of starch. Exemplary starches include corn, wheat, barley, oats, sorghum, tapioca, isolated dry or wet milled starch, their milled components and combination of any two or more of these. The amount of starch in the particles can vary and is generally at least about 20 percent by weight of the particles. In some preferred embodiments, the amount of starch is between about 20 percent by weight and about 30 percent by weight. Starch content of greater than 30 percent by weight in the particles are also within the scope of this invention.

The particles may also include a protein component. A wide assortment of protein sources can be included in the particles and preferably include soybean meal, cottonseed meal and corn gluten meal. Other proteinaceous sources include other oil seed meals such as palm meal; animal by-product meals such as meat meal, poultry meal, blood meal, feather meal and fishmeal; plant by-product meals such as wheat middlings, soybean hulls and corn by-products; and microbial protein such as torula yeast and brewer's yeast. The amount of protein in the particles can vary. Preferably, the protein content in the particles is between about 1 percent by weight and about 30 percent by weight. More preferably, the protein content in the particles is about 10 percent by weight.

As described herein, the feed particles include a high amount of fat. The fat that is included can be one or more types of fat. The fat, for example, can include a combination of low melting point fat and a high melting point fat. The feed particles described herein, for example, contain a low melting point fat that is generally in the interior of the particles and a high melting point that is generally on the exterior and/or the outer sections of the particles. This results in particles that harden at ambient temperature and thus, have a dry, not sticky, exterior with improved flowability that is extremely advantageous for handling. The combination of a low melting point fat interior and a high melting point fat exterior allows the animal feed particles to be loaded with high amounts of fat while maintaining the integrity and texture of the animal feed particles.

A variety of fats are suitable as low melting point fats and include, for example, beef tallow, soybean or other vegetable oils and fish oil. The low melting point fat can be any fat that melts below the temperature the product will be exposed to during shipping. The low melting point fat used may differ depending on the time of the year the particles are shipped or the method of shipping. In some preferred embodiments, tallow is used as the low melting point fat.

The high melting point fat can be animal fat, vegetable fat, fractionated fat and/or hydrogenated fat. Suitable high melting point fats include fats that contain palmitic acid, stearic acid, lauric acid, myristic acid, coco butter and any hydrogenated fat or oil. Waxes can also be used, but are generally not desirable due to their low digestibility. Combinations of two or more types of fat may also be used if the combined melting point of the fats is in the suitable range.

In some preferred embodiments, palm stearin is used as the high melting point fat. Palm stearin can have varying amounts of palmitic acid content. Generally, as the amount of the palmitic acid in the palm stearin increases, the melting point of the palm stearin increases. Thus, palm stearin with different palmitic acids may be selected depending on the specific melting point desired for the high melting point fat. The high melting point fats are preferably distillates of palm oil, typically referred to as palm stearin, with a variable amount of palmitic acid content. In one exemplary embodiment, the palmitic acid content in palm stearin is about 65 percent. Palm stearin with other percentages of palmitic acid are also within the scope of the invention.

The melting point range of the high melting point fat can vary and may be selected based on the season that the animal feed particles will be used, stored and/or transported. Generally, the melting point range of high melting point fat is higher than the low melting point fat. In summer, for example, the melting point range of the high melting point fat can be between about 120° F. and about 130° F. Alternatively, if the product will be used, stored and transported in the winter, the melting point range of the high melting point fat can be lower. The low melting point fat can be between about 60 F and 115 F.

The melting point range of the high melting point fat is generally above 40° F. Preferably, the melting point range is above 100° F. and more preferably above 110° F. in the summer. For animal feed that will be used in winter, the melting point ranges may be between about 40° F. and about 100° F. The animal feed particles with the high melting point fat having a melting point above 100° F. may also be used in the winter and fats having melting point below 100° F. may be used in the summer and are within the scope of this invention.

The ratio of low melting point fat to high melting point fat can vary. In a preferred embodiment, the ratio of low melting point fat to high melting point fat is about 50:50. In another preferred embodiments the ratio of low melting point fat to high melting point fat is about 90:10. Other ratios of low melting point fat to high melting point fat are also within the scope of this invention. Feed particles containing either only low melting point fat or only high melting point fat are also within the scope of the invention.

Additives other than nutritional components and fat may also be present in the particles. Additives that may be present include flavorings such as amino acids, molasses, coloring and dye ingredients, vitamins and minerals, nutraceuticals and pharmaceuticals and various processing aids such as talc and calcium carbonate. These additives may be added into the nutritional components or into the fat components. In preferred embodiments, ingredients such as talc and calcium carbonate are included.

The animal feed particles also have desirable flowability characteristics. Multiple flow tests are available and can be used to determine the flowability of the animal feed particles. Animal feed particles are placed into carts that are 3 feet by 3 feet by 3 feet with 45° sloped hopper and a 12 inch square opening. The carts are stored in controlled temperature rooms and then the number of hammer blows and the length of time to remove the product from the cart are recorded. The number of hammer blows needed to remove the product from the cart can vary and are preferably less than about 5 hammer blows. In one exemplary embodiment, one hammer blow is sufficient to remove all of the feed particles from the cart.

The present invention includes methods for forming extruded animal feed particles with a high fat content. Animal feed particles can be formed by combining one or more components into a mixture and then extruding the mixture. The mixture may include, for example, starch, protein and some fat. The fat may be endogenous fat within the ingredients used in the mixture or some fat may be added to the mixture. The mixture generally comprises a substantial amount of starch. Exemplary starches are described above. The amount of starch in the mixture is generally between about 10 percent by weight and about 50 percent by weight. More preferably, the amount of starch in the mixture is between about 20 percent by weight and about 35 percent by weight. The animal feed particles made using this method maintain the palatability and digestibility as described above while providing enhanced energy intake for the animals.

The mixture may also include a protein component. A wide assortment of protein sources can be included as described above. The amount of protein in the mixture can vary. Generally, the amount of protein in the mixture is about 60 percent by weight or less. Preferably, the amount of protein in the mixture is between 10 percent by weight and about 60 percent by weight. In a preferred embodiment, the amount of protein in the mixture is about 20 percent.

Particle size is an important physical characteristic of the dry components used for making the mixture. The particle size in the blend containing the starch and/or protein is generally very fine. Generally, at least about 30%, preferably at least about 45% and more preferably at least about 60% of the starch and protein particles can pass through a Tyler No. 100-mesh screen.

The mixture may also include added fat. "Added fat" includes liquid and soluble materials comprising edible mono-, di- and triglycerides of fatty acids and free fatty acids which are not inherently present in the starch source, protein source or any other nonfat source present in the blend. Added fat includes both animal fat, e.g. bleachable fancy tallow, beef tallow, choice white grease, yellow grease, etc. vegetable oil, e.g. soybean oil, palm oil, cottonseed oil, sunflower oil, etc; and combinations of any of these. The amount of added fat in the mixture is generally less than about 10 percent by weight, preferably less than about 5 percent by weight and more preferably, less than about 3 percent by weight.

Ingredients other than starch, protein and added fat may also be present in the mixture and these additives are described above. In preferred embodiments, ingredients such as talc, calcium carbonate, and fat emulsifiers are included and are fine enough to substantially pass through a 325 mesh screen.

The particles are formed through the use of conventional extrusion devices such as that disclosed in U.S. Pat. No. 3,496,858. FIG. 1 illustrates an exemplary embodiment of an arrangement performing the procedure for the present invention. Mixture components are added through hopper or bin 10 to conditioner 12. As is known in the art, the mixture is prepared in conditioner 12 for subsequent treatment in extruder 14. The mixture is extruded and the extruded particles are placed into drier 18. The extruded product is dried and preferably, not cooled. The dried product is added to mixer 22. Control device 26 starts mixer 22. After a pre-set time, control device 26 evacuates the mixer using a vacuum pump 30 to a negative pressure in the mixer provide during the mixing process. Control Device 26 can be programmed to add the desired amount of low melting point fat which is pumped into mixer 22 by a dosing pump 24 from pipe 27 connected to fat tank 28 that contains the low melting point fat. After a pre-set time, the control device 26 selects pressure relief valve 32 that is open to the atmosphere. The negative pressure is partially released via the pressure relief valve 32 to allow some atmospheric air back into mixer 22. The incoming air conveys the low melting point fat well into the pores of the particles saturating the interior part of the particle with low melting point fat. Control device 26 can then be programmed to switch to a higher melting point fat which is now pumped into mixer 22 by dosing pump 24a. High melting point fat is added by dosing pump 24a from pipe 27a that is connected to fat tank 28a. After a pre-set time, control device 26 selects pressure relief valve 32 to release the remaining negative pressure. The incoming atmospheric air can force the high melting point fat into the particles but near the outer section or surface of the particles since the particle core contains the low melting point fat. In addition, some of the high melting point fat forms a coating around the particles. After the process of applying fat, the particles are transferred from mixer 22 into a cooler 36 and into a storage container 40.

Generally, the starch and other dry ingredients, if any, such as protein, talc and calcium carbonate are first blended in a dry mixer to form a relatively homogeneous mixture, and this mixture is then fed to the extruder, typically through the conditioner. If desired, fat is added at the conditioner, and once the mixture of fat and nonfat ingredients is a relatively homogenous, free-flowing mass, it is fed into the extruder barrel where it can be admixed with additional fat, if necessary. The extruder conditioner usually operates at a temperature of at least about 150° F., and this temperature in combination with the pressure caused by the action of the rotating screw on the mixture and the friction between the flowing mixture and the component parts of the extruder result in a pressure within the extruder typically in excess of 20 psig, preferably in excess of 30 psig. The mixture is mechanically worked by the rotating screw until it eventually flows in a generally fluid manner.

Steam is also added to the extruder (at both the conditioner and barrel) to increase the temperature of the material, typically to or in excess of about 212° F. and/or to raise the moisture content of the mixture. The amount of heat and steam applied to the mixture is controlled by known valving techniques in a manner to obtain temperatures which are sufficiently high to cause the desired chemical and physical reactions within the mixture. The amount of heat and steam actually added to a given mixture of added fat and nonfat ingredients will vary with the nature and ratio of components and the other operating parameters of the extruder, e.g. pressure, residence time of the mixture, etc.

After the mixture with the fat added at the conditioner and any optional ingredients has been sufficiently blended and cooked, it is forced from the extruder by the rotating screw through a restricted orifice. Since the mixture emerges from an environment of high temperature and pressure into an environment of lower temperature and pressure, the mixture expands upon leaving the extruder. This results in a cooling of the mixture and a partial loss of its water content. The mixture leaves the extruder in an extended ribbon which is cut into particles by conventional cutting means, typically as it leaves the extruder.

The extruded product generally has a lot of air pockets in the particles such that additional fat can be incorporated. Generally, the extruded product has a bulk density of less than about 40 pounds lbs/bushel. Preferably, the extruded product has a bulk density of less than about 30 lbs/bushel and more preferably less than about 20 lbs/bushel. The particle generally "hardens" as it exits the extruder due to the starch.

The extruded product is generally dried but not significantly cooled. The extruded product preferably is dried to contain about less than 10 percent by weight moisture and more preferably dried to contain about less than 5 percent by weight moisture. The temperature of the extruded product is preferably kept above 140° F. and more preferably above 160° F. This temperature may vary depending on the fat that is used in the coating step.

The dried, hot extruded product can be placed into a vacuum coater. Coating of extruded products maintained at other temperatures are also within the scope of the invention. Vacuum coaters are known in the art and conventional vacuum coaters are used to coat feed particles with a desired coating. Vacuum is applied to the chamber of the vacuum coater containing the extruded particles. The vacuum pulled is generally at least about 20" Hg and preferably at least about 25" Hg.

A low melting point fat is generally introduced into the vacuum coater. In some embodiments, the low melting point fat is added while a vacuum is being pulled. In alternative embodiments, the extruded particles and the low melting point fat are placed in the vacuum coater prior to pulling a vacuum. The pressure in the vacuum can be partially released. Preferably, the vacuum is released slowly. Preferably, the vacuum is released to between about 10" Hg to about 15" Hg lower than the initial vacuum being pulled. In an exemplary embodiment, the vacuum is released to about 15" Hg from about 27" Hg in about 20 seconds. The partial release of the vacuum can cause the low melting point fat to penetrate (permeate) the extruded particles such that the low melting point saturates the extruded particle with low melting point fat. A high melting point fat is generally introduced into the vacuum coater after the partial release of the vacuum. Any suitable high melting point fat may be used.

After addition of the high melting point fat into the vacuum coater, the remaining vacuum is slowly released. In an exemplary embodiment, the vacuum is released over about 20 seconds. After the release of the vacuum, the product is, preferably, held for a short time, e.g. about 5 minutes. The product may then be cooled.

The present invention also includes a method of feeding dairy cows. The method can include feeding the extruded particles described herein to the dairy cows. The extruded particles with the high amounts of fat maintain palatability and digestibility while providing the dairy cows with enhanced energy intake. The dairy cows fed with the extruded particles can have desirable characteristics, for example, increased metabolizable energy.

EXAMPLES

Example 1

Influence of Two Levels of Glycerol, Two Levels of Palm Stearin, and Their Combination in 24% Starch Diets on Total Tract Digestibility, Energy Balance and Milk Component Yield in Post-Peak Lactating Cows.

This study was designed to titrate the effects of palm stearin and glycerol on energy kinetics and milk component production in lactating dairy cattle. Both ingredients were tested at either 1 or 2 percent of Dry Matter Intake (DMI) along with a treatment containing a combination of 1% of each ingredient. The amount of glycerol and palm stearin in each of the rations are shown in Table 1. The estimated metabolizable energy (Est. ME) content of each diet was calculated from the formula weighted average of the tabular ME value of each ingredient in the formula.

TABLE 1

| Rations | Est. ME, meal/kg DM | Stearin, % of DMI | Glycerol, % of DMI | 1 | 2 | 3 | 4 | 5 | 6 |
|---|---|---|---|---|---|---|---|---|---|
| A | 1.30 | | | X | | | | | |
| B | 1.33 | 1 | | | X | | | | |
| C | 1.36 | 2 | | | | X | | | |
| D | 1.30 | | 1 | | | | X | | |
| E | 1.31 | | 2 | | | | | X | |
| F | 1.33 | 1 | 1 | | | | | | X |

Materials and Methods:

24 Holstein cows were subjected to 6 treatments in 2 periods of feeding in the total collection area of the Large Animal Metabolism Unit (LAMU) at the Longview Animal Nutrition Center, Gray Summit, Mo. Cows were weighed. There were 4 cows per treatment, with a minimum of 3 multiparous animals per treatment, fed over two periods (with 2 cows/treatment/period). Cows were between 100 and 250 Days In Milk (DIM) at the start of the study. Periods were 3 weeks in length. Some of the animals from the first period were used in the second period, if cow availability was short, so long as they were not put back on the same treatment.

The animals were allowed to adjust to the diets for a minimum of two weeks once full treatment feed intake was achieved. During this adjustment phase, feed offerings and refusals were measured daily, but no samples collected. After completion of the adjustment period, there was a 5 day total collection of urine and feces.

The compositions for each of the rations in the treatments are shown in Table 2. The numbers indicate the percentage in the ration.

TABLE 2

| | Ration A | Ration B | Ration C | Ration D | Ration E | Ration F |
|---|---|---|---|---|---|---|
| 40% fat particles | 3.2031 | 3.2096 | 3.2162 | 3.2101 | 3.2172 | 3.2167 |
| Glycerol | | | | 1.6051 | 3.2172 | 1.6083 |
| Palm stearin | | 1.6210 | 3.2487 | | | 1.6246 |
| Grain premix | 96.4993 | 94.1773 | 92.543 | 94.8873 | 93.268 | 93.2528 |
| Micronutrients | 0.2976 | 0.9921 | 0.9921 | 0.2975 | 0.2977 | 0.2976 |
| Total | 100 | 100 | 100 | 100 | 100 | 100 |

All animals were fed the assigned diets according to the proportions shown in Table 3. The alfalfa hay was from a consistently homogenous supply. Diets were offered three times daily. Corn silage and alfalfa hay were delivered as a mix to the LAMU. Composite subsamples of the forage mix were constructed during each collection period. The corn silage was raised on non-irrigated bottom land near Labadie, Mo. They were harvested to an average TLC of ¾" and were not processed.

TABLE 3

| | Treatment I.D: | | | | | |
|---|---|---|---|---|---|---|
| | 1 | 2 | 3 | 4 | 5 | 6 |
| | % of diet DM | | | | | |
| Ration A | 55 | | | | | |
| Ration B | | 55 | | | | |
| Ration C | | | 55 | | | |
| Ration D | | | | 55 | | |
| Ration E | | | | | 55 | |
| Ration F | | | | | | 55 |
| Corn Silage, N48-V8 | 22.5 | 22.5 | 22.5 | 22.5 | 22.5 | 22.5 |
| Alfalfa Hay | 22.5 | 22.5 | 22.5 | 22.5 | 22.5 | 22.5 |

Animals had diets available to them at all times (offered 3 times per day) but DMI among all animals was not allowed to vary by more than 0.5% of body weight during the collection week. Dry matter intakes were fixed 3 days prior to and during the collection period. Excessive feed refusals (weighbacks) were avoided to minimize sorting. Feed mixing charts ("as fed" based) were constructed after dry matter measurements of all feed ingredients were taken. The dry matter content of the forage mixture was monitored daily during the collection period and mixing rates adjusted accordingly, if the DM of the mixture changed from that calculated initially.

The duration of the adjustment period was 2 weeks. Observations of daily offering and refusals of dietary ingredients were recorded every day. No samples were collected.

The duration of the collection period was 5 days. Observations were recorded and samples collected. The daily observations recorded included daily water consumption, daily room temperature, daily offering of dietary components, daily refusal of remaining diet, daily milk production, and daily milk composition (Monday through Friday).

the addition of 2% glycerol, or 1% glycerol in combination with 1% stearin addition to the diet (Table 4). Acid Detergent Fiber (ADF) digestibility was linearly depressed by the addition of both stearin (P<0.05) and glycerol (P<0.01) (Table 4). Either 1% stearin or 1% glycerol can be used as an alternative energy source in animal feed particles. However, 1% stearin had a greater effect on increasing the energy density of the diet.

TABLE 4

| Treatment | 1 | 2 | 3 | 4 | 5 | 6 | SE | (1) | (2) | (3) |
|---|---|---|---|---|---|---|---|---|---|---|
| Milk Fat kg/d | 1.42 | 1.41 | 1.23 | 1.43 | 1.39 | 1.30 | 0.0685 | | .07 | |
| DM Intake kg/d | $27.5^{bc}$ | $23.5^{a}$ | $25.4^{ab}$ | $30.1^{c}$ | $26.8^{abc}$ | $26.0^{ab}$ | 1.23 | .04 | | |
| Dig. Energy Mcal/kg DM | $3.27^{ab}$ | $3.32^{bc}$ | $3.37^{c}$ | $3.22^{a}$ | $3.21^{a}$ | $3.32^{bc}$ | 0.0306 | .01 | .04 | |
| ME (EE)* Mcal | $77.8^{ab}$ | $67.7^{a}$ | $74.5^{ab}$ | $84.0^{b}$ | $74.8^{ab}$ | $75.4^{ab}$ | 3.5 | .12 | .12 | |
| Fat Dig. (AH)* % of Intatke | $64.8^{ab}$ | $73.2^{c}$ | $71.4^{c}$ | $64.7^{ab}$ | $64.0^{a}$ | $69.5^{bc}$ | 1.73 | .01 | .02 | |
| NDF Digested % of Intake | $52.8^{b}$ | $51.3^{b}$ | $51.6^{b}$ | $51.3^{b}$ | $46.8^{a}$ | $46.1^{a}$ | 1.44 | .02 | | .01 |
| ADF Digested % of Intake | $55.4^{b}$ | $51.5^{ab}$ | $50.0^{a}$ | $51.3^{ab}$ | $47.4^{a}$ | $46.9^{a}$ | 1.71 | .04 | .05 | .01 |

PR > F if < .20 for (1) TRT (2) Lin stearin Trt 123 (3) Lin Glycerol Trt 145
Means in the same row not followed by a common letter differ(P < .05) using LSD procedure.
*EE is ether extractable fat and AH is acid hydrolyzed extractable fat Samples of the diets were collected and a composite was made of daily subsamples of each dietary ingredient (rations and forage mix) collected during each preceding day of the collection period. The dry matter (DM) content of each dietary ingredient controlled at the LAMU was measured and reported as a "LAMU DM". Forage composites were coarsely chopped on a 8 mm screen in the Fitz Mill prior to subsampling.

Samples of Weighbacks were also collected. During the collection period, weighbacks were quantitatively recovered each day preceding a collection day, weighed and a constant percentage subsampled. Subsamples were composited for each animal within each period. A representative sample of feces, milk and urine was collected at a constant percentage daily from each animal for five days. A five day composite was constructed for each animal. Feces were dried and a DM measurement made and reported to Analytical Services. Urine and milk were sent to Analytical Services for freeze drying.

Lab Analysis: Analyses of feed, feces and urine on a per period minimum were performed. Wet samples were dried in a forced draft oven set at a temperature not to exceed 60 degrees centigrade.

DMI was lowest with the diet containing 1% stearin and highest for the diet containing 1% glycerol (P<0.04 Table 4). Milk fat synthesis (kg/d) was depressed by 2% stearin (P<0.07; Table 4). The densities of digestibility energy (DE) and metabolizable energy (ME) in the diet (mcal/kg) were improved by increasing levels of stearin in the diet (P<0.04 and P<0.02, respectively; Table 4). Fat digestibility was increased (P<0.02) whenever stearin was added to the diet, indicating that the digestibility of fat from stearin was greater than endogenous dietary fat (Table 4). Neutral Detergent Fiber (NDF) digestibility was not depressed by the addition of stearin to the diet, but was depressed (P<0.01) by The nutrient composition of each of the diets is shown in Table 5 as a percentage of the dry matter.

TABLE 5

| Treatment | 1 | 2 | 3 | 4 | 5 | 6 |
|---|---|---|---|---|---|---|
| Protein % of DMI | 18.7 | 18.7 | 18.4 | 19.1 | 19.0 | 18.6 |
| Fat (EE) % of DMI | 3.53 | 4.46 | 5.45 | 3.53 | 3.50 | 4.64 |
| Fat (AH) % of DMI | 4.64 | 5.48 | 6.38 | 4.41 | 4.46 | 5.46 |
| NDF % of DMI | 32.6 | 31.8 | 32.1 | 33.9 | 30.9 | 29.6 |
| ADF % of DMI | 21.8 | 20.7 | 20.2 | 21.8 | 20.4 | 19.0 |
| Starch % of DMI | 24.9 | 24.0 | 23.8 | 24.0 | 23.8 | 25.7 |

Example 2 influence of High or Low Palmitic Acid Palm Stearin on Total Tract Digestibility, Energy Balance, Nitrogen Balance and Milk Component Yield in Post-Peak Lactating Cows Consuming Higher Starch Diets This study demonstrates the suitability of different palm stearins as higher melting point fat alternatives. Results from feeding 1% (0.5 lb/day) or 2% (1.0 lb/day) palm stearin (Example 1) demonstrated that adding 1% of palm stearin into the diet increased the ME content of the diet, without adversely influencing total tract NDF digestibility. This study (Example 2) was designed to improve the handling characteristics of the particles by capitalizing on the higher melting point of palm stearin to retard the leaching of tallow from particles.

The palm stearin used in Example 1 was not greatly refined, and contained a relatively low (65%) level of palmitic acid. A more refined palm stearin could further enhance our ability to manufacture higher fat animal feed particles. This study also evaluated the effects of palmitic acid level on digestibility and subsequent energy value.

MATERIALS AND METHODS:

Table 6 shows the contents of each of the treatment rations used in this study and Table 7 shows the feeding proportions in each of the treatments.

TABLE 6

| | Low C16:0 Stearin, lb/day | High C16:0 Stearin, lb/day | ME, meal/lb DM | 40% fat particle, % of DMI | 1 | 2 | 3 | 4 | 5 | 6 |
|---|---|---|---|---|---|---|---|---|---|---|
| A | 0 | 0 | 1.30 | 2 | X | | | | | |
| B | 0.5 | 0 | 1.33 | 2 | | X | | | | |
| C | 1.0 | 0 | 1.36 | 2 | | | X | | | |
| D | 0 | 0.5 | 1.33 | 2 | | | | X | | |
| E | 0 | 1.0 | 1.36 | 2 | | | | | X | |
| F | 0 | 0 | 1.36 | 7 | | | | | | X |

TABLE 7

| Treatment I.D: | 1 | 2 | 3 | 4 | 5 | 6 |
|---|---|---|---|---|---|---|
| Ration A | 55 | | | | | |
| Ration B | | 55 | | | | |
| Ration C | | | 55 | | | |
| Ration D | | | | 55 | | |
| Ration E | | | | | 55 | |
| Ration F | | | | | | 55 |
| Corn Silage, N48-V8 | 22.5 | 22.5 | 22.5 | 22.5 | 22.5 | 22.5 |
| Alfalfa Hay | 22.5 | 22.5 | 22.5 | 22.5 | 22.5 | 22.5 |

The procedures were as described for Example 1. The composition of the grain rations is shown in Table 8.

TABLE 8

| | Ration A | Ration B | Ration C | Ration D | Ration E | Ration F |
|---|---|---|---|---|---|---|
| 40% fat particles | 3.2031 | 3.2095 | 3.2160 | 3.2095 | 3.2160 | 11.5380 |
| Palm Stearin high C16 | | | | 1.6048 | 3.2160 | |
| Palm stearin Low C16 | | 1.6048 | 3.2160 | | | |
| Grain premix | 95.9040 | 94.2927 | 92.675 | 94.2927 | 92.675 | 88.1940 |
| Micronutrients | 0.8929 | 0.8930 | 0.8930 | 0.8930 | 0.8930 | 0.2680 |
| Total | 100 | 100 | 100 | 100 | 100 | 100 |

DM intakes between the all tallow treatment particles and treatment particles containing various palmitic acid levels from palm stearin were not significantly different. While there were no significant differences between the all tallow treatments and the various palmitic acid levels from palm stearin on 3.5% FCM (Fat Corrected Milk) production or components, the higher level (1 lb) of the higher palmitic acid stearin produced the highest numeric production of FCM (47.6 kg), milk fat (1.48 kg) and milk protein (1.34 kg). Fat digestibility among the various palmitic acid levels from palm stearin was slightly, but significantly higher ($P<0.06$) compared with the all tallow treatment particles. Measured dietary ME densities corresponded with formulated levels.

Results from this study and Example 1 show that in isocaloric diets palm stearin is an acceptable alternative or complement to beef tallow in animal feed particles without compromising DM intake, milk component production or energy availability. Furthermore, palmitic acid level in palm stearin does not appear to negatively influence performance versus tallow, allowing flexibility in use to improve handling characteristics of animal feed particles (by leveraging the differences in the melting point resulting from palmitic acid levels).

Example 3

Influence of 50% Fat Particles Containing Mixtures of Tallow and Palm Stearin on Total Tract Digestibility, Energy Balance, Nitrogen Balance and Milk Component Yield in Post-Peak Lactating Cows Consuming Higher Starch Diets.

The suitability of palm stearin or its refined derivatives as higher melting point fat alternatives have been shown. The fat level in animal feed particles was raised to 50%. Palm stearin was used at levels not to exceed 0.75 lb/day, to increase the fat content, and subsequent energy level of the particles. This study also shows the improved handling characteristics of animal feed particles by capitalizing on the higher melting point of palm stearin to retard the leaching of tallow from animal feed particles, in addition to specific processing enhancements. Fat leaching analysis conducted at the LAMU has shown improvements in handling characteristics when 50% of the tallow is replaced with palm stearin.

In Example 1, there were trends for lower DM intake when palm stearin was used in place of tallow. However, palm stearin was added as a liquid to the pelleted portion of the diet in that study. In this study, comparisons were made between adding tallow or a 50/50 tallow/palm stearin blend (to increase the melting point and reduce potential leaching during transit) in either liquid or as a particle form (approximately 3 lbs of particles/day) to look at differential effects of form on DM intake and digestibility and metabolizability. The particle form of Rations D and E was an extruded particle with the higher levels of fat but coated with the higher melting point fat made as described in Example 4. Both a negative control (only pelleted feed, no added fat particles) and a positive control (extruded 40% fat particles) were included for comparison. Table 9 shows the composition of each of the diets. The procedures for treatment of the cows was as described in Example 1. The mixing ratios of the dietary components are shown in Table 10 and the ingredient composition of the grain mixes as a weight percentage are shown in Table 11.

TABLE 9

| | Low C16:0 Stearin, lb/day | Tallow lb/day | ME mcal/lb DM (approx.) | Form | 1 | 2 | 3 | 4 | 5 | 6 |
|---|---|---|---|---|---|---|---|---|---|---|
| A | 0 | 0 | 1.30 | — | X | | | | | |
| B | 0 | 1.5 | 1.36 | Liquid | | X | | | | |
| C | 0.75 | 0.75 | 1.36 | Liquid | | | X | | | |
| D | 0 | 1.5 | 1.36 | 50% Nugget | | | | X | | |
| E | 0.75 | 0.75 | 1.36 | 50% Nugget | | | | | X | |

TABLE 9-continued

|   | Low C16:0 Stearin, lb/day | Tallow lb/day | ME mcal/lb DM (approx.) | Form | 1 | 2 | 3 | 4 | 5 | 6 |
|---|---|---|---|---|---|---|---|---|---|---|
| F | 0 | 1.20 | 1.34 | 40% fat particle | | | | | | X |

TABLE 10

| Treatment I.D: | 1 | 2 | 3 | 4 | 5 | 6 |
|---|---|---|---|---|---|---|
| Ration A | 55 | | | | | |
| Ration B | | 55 | | | | |
| Ration C | | | 55 | | | |
| Ration D | | | | 55 | | |
| Ration E | | | | | 55 | |
| Ration F | | | | | | 55 |
| Corn Silage, N48-V8 | 22.5 | 22.5 | 22.5 | 22.5 | 22.5 | 22.5 |
| Alfalfa Hay | 22.5 | 22.5 | 22.5 | 22.5 | 22.5 | 22.5 |

TABLE 11

|   | Ration A | Ration B | Ration C | Ration D | Ration E | Ration F |
|---|---|---|---|---|---|---|
| Beef Tallow liquid | | 4.8191 | 2.4102 | | | |
| Beef Tallow Nugget (50% Fat) | | | | 9.6543 | | |
| 50:50 tallow:palm st, Nugget (50% Fat) | | | | | 9.6543 | |
| 40% Fat particles | | | | | | 9.6577 |
| Palm stearin | | | 2.4102 | | | |
| Grain premix | 99.7000 | 94.1809 | 94.1795 | 90.0778 | 90.0778 | 89.44 |
| Micronutrients | 0.3000 | 1.0000 | 1.0001 | 0.2679 | 0.2679 | 0.8929 |
| Total | 100 | 100 | 100 | 100 | 100 | 100 |

Figure 2:
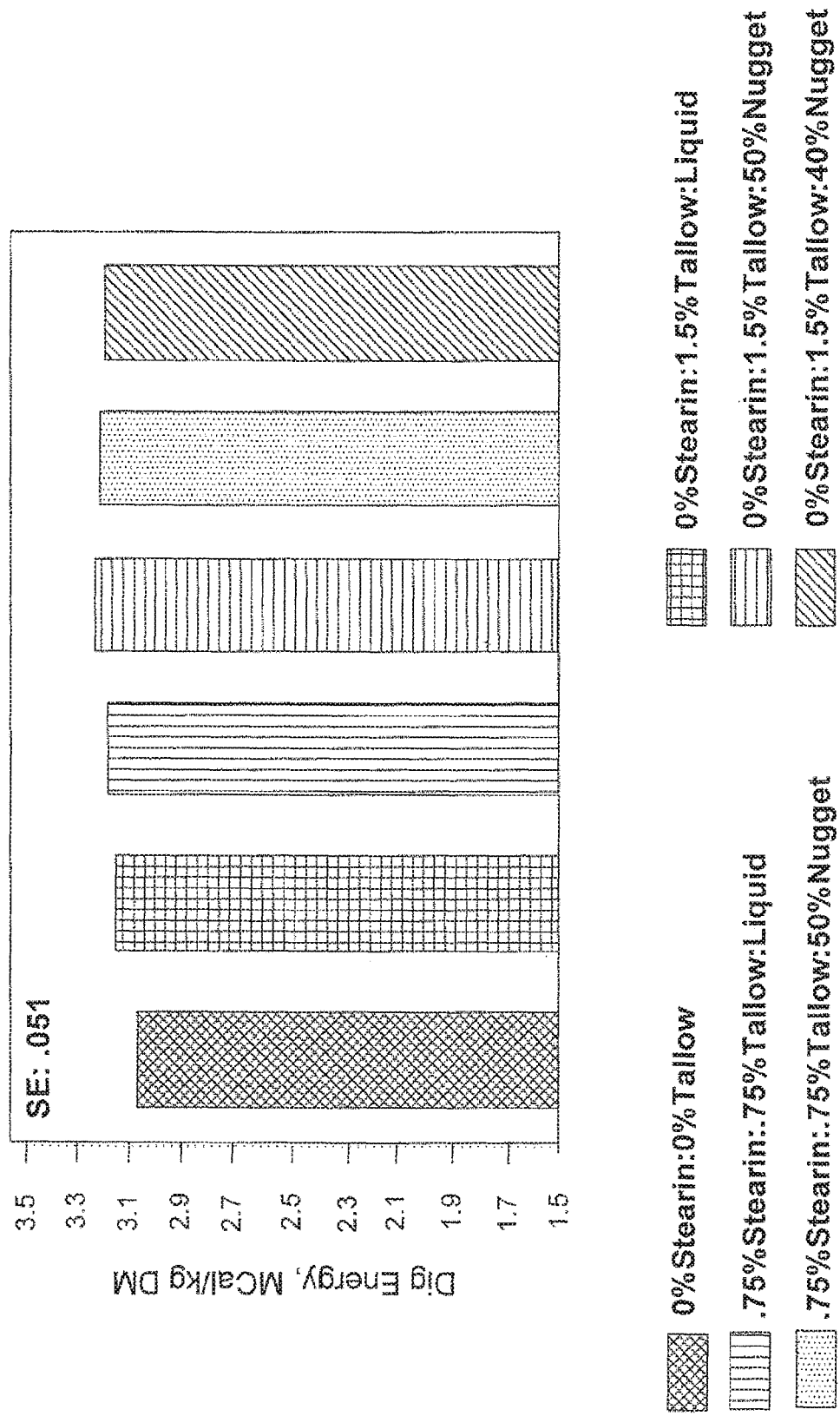
FIG. 2 is a plot of the digestible energy of particles made according to different protocols.
Figure 3:
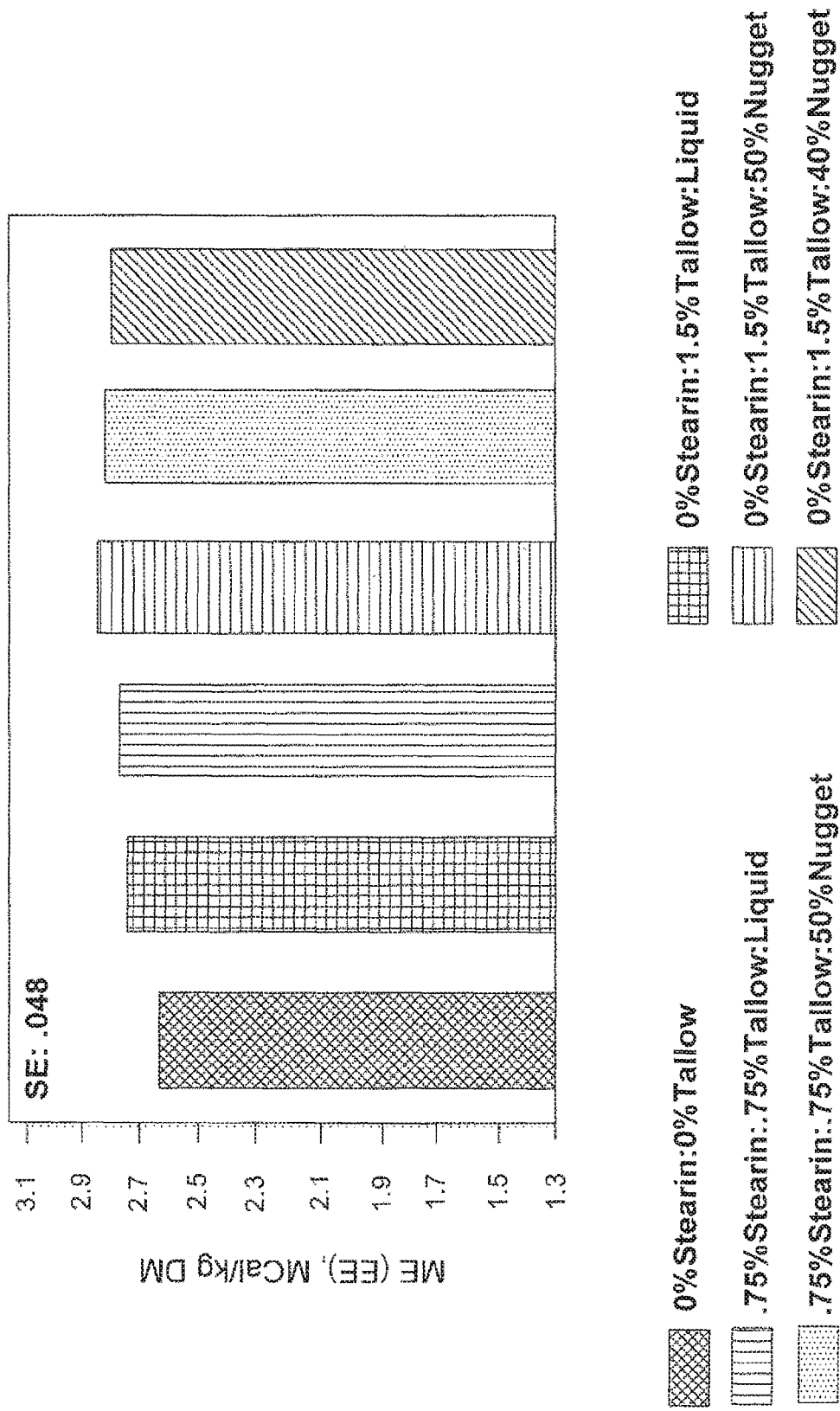
FIG. 3 is a plot of the metabolizable energy of particles made according to different protocols.
Figure 4:
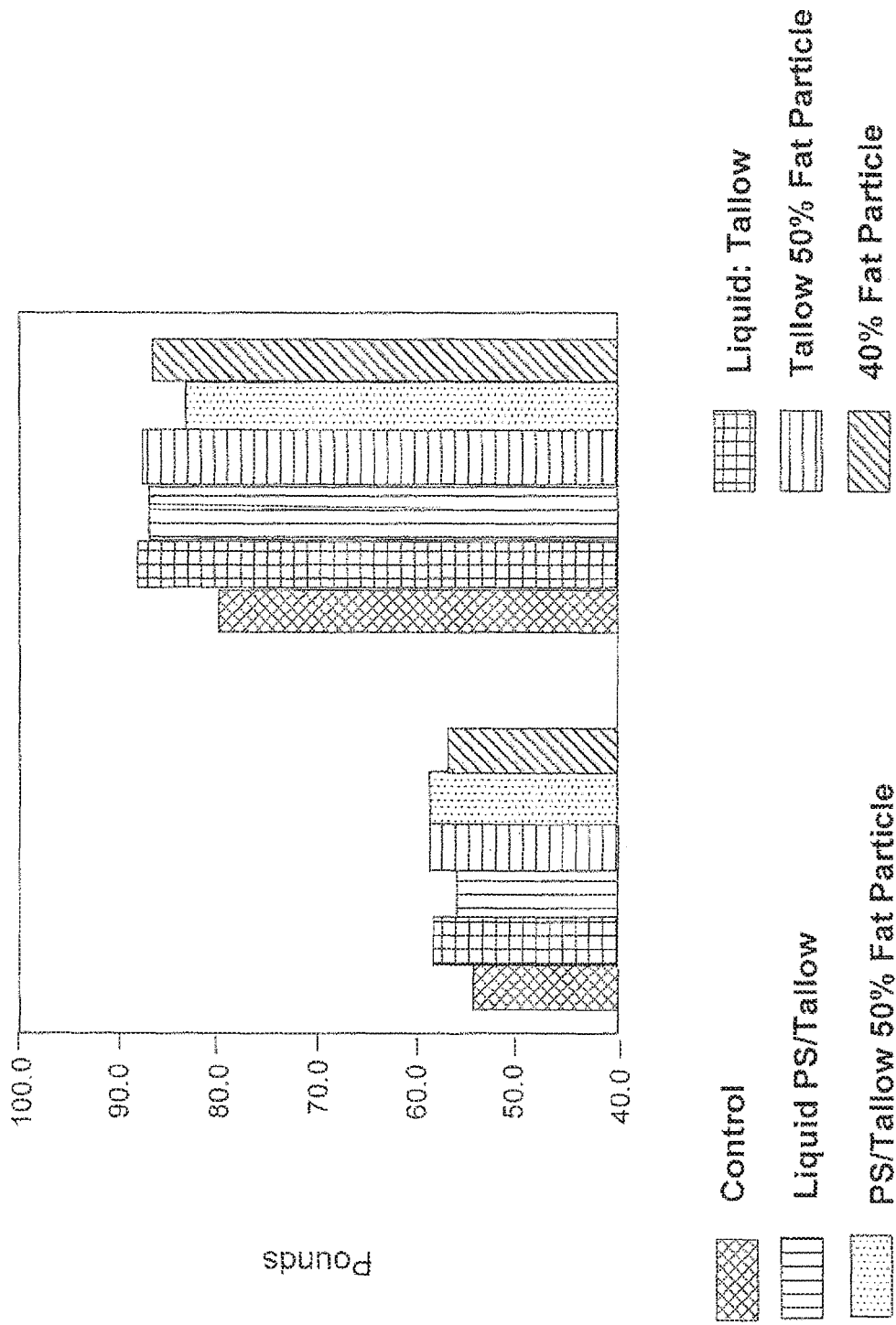
FIG. 4 is a plot of the dry matter intake and FCM of the particles made according to the different protocols.

The nutrient digestibility results are shown in Table 12 and illustrated graphically in FIG. 2 and FIG. 3. Dry matter intake and FCM are shown in FIG. 4. There were no significant effects by treatment on DMI or production of milk components. There were no significant effects by replacing half of the tallow with palm stearin on the digestible energy (DE) or metabolizable energy (ME) content of the diet (Trt. 2 and 4 vs. Trt. 3 and 5). However, there was a significant improvement in DE ($P<0.06$) and ME ($P<0.04$) from providing tallow or tallow+palm stearin in an extruded, compared with a pelleted feed (contrast Trt. I vs. Trt 4 and 5). Measured dietary ME values for all treatments, paralleled the formulated values. There were no significant effects by treatment on the digestibility of NDF or starch. Palm stearin can replace up to 0.75 lbs of tallow compared with a diet containing 1.5 lbs of tallow, without any loss in energy, milk components, DM intake or digestibility of dietary starch or NDF. Extrusion increases the energy content of a high fat diet, as compared with a pelleted diet containing an equal amount of fat.

TABLE 12

| Treatment | 1 | 2 | 3 | 4 | 5 | 6 | SE | (1) | (2) |
|---|---|---|---|---|---|---|---|---|---|
| DM digested % of Intake | 69.5 | 69.5 | 69.4 | 70.4 | 71.0 | 70.9 | 1.02 | | |
| Dig. Energy Mcal/kg DM | 3.07 | 3.14 | 3.16 | 3.20 | 3.19 | 3.17 | 0.0507 | .06 | |
| ME (EE) Mcal/kg DM | 2.66 | 2.72 | 2.75 | 2.79 | 2.79 | 2.76 | 0.0476 | .04 | |
| Fat Dig. (AH) % of Intake | 58.6 | 56.9 | 62.2 | 64.6 | 57.2 | 62.4 | 3.27 | | |
| NDF Digested % of Intake | 49.4 | 53.2 | 50.6 | 51.4 | 52.1 | 52.7 | 1.74 | | |
| Starch Dig. % of Intake | 96.7 | 96.5 | 96.6 | 97.0 | 97.0 | 97.2 | 0.489 | | |

PR > F if < .20 for (1) STEARIN*TALLOW*FORM (2) Trt 1 vs 4 + 5
means in the same row not followed by a common letter differ ($P < .05$) using LSD procedure.

Example 4

Process for making extruded particles in Example 3.

Animal feed particles were made in a 6000 pound batch with about 62 percent of corn and milo flour and about 33 percent of soybean meal. The corn, milo and the soybean were ground very fine such that 60% passed through a 100 mesh screen. 0.5% talc, 1% calcium carbonate (passed through a 325 mesh screen) were added at the batch mixer and 3% fat was added at the extruder conditioner. The extruder was an Anderson 8" extruder equipped with 150 hp motor. The extrusion was performed under the following conditions: feed rate 60 lbs/min.; water conditioner 15%;

meal temperature 225 degree F.; Amps 175; Die 30/64" holes; knife blades 16; final moisture 3-4%. The product was extruded such that the bulk density of the extruded product was about 21 lbs/bushel.

The extruded product was dried until the moisture content was between about 2 to 5 percent by weight. The extrudate was not, however, cooled. The temperature was kept above about 160° F. The hot product was placed in a vacuum coater and a vacuum of about 27 inches was pulled. The coater was a 200 liter test unit from A & J Mixing International, Oakville, ON, Canada. Beef Tallow (low melting point fat), about 23.75%, was added to the vacuum coater. The vacuum was partially released to about 15 inches over about 20 seconds. Palm Stearin, a high melting point fat, was added to the vacuum coater at a weight percentage of 23.75%. The remaining vacuum was slowly released over about 20 seconds. The product was held for about 5 minutes and cooled. The calculated fat content was about 50%.

The animal feed particles were evaluated for flowability. Animal feed particles were placed in a cart that was 3 feet by 3 feet by 3 feet with 45° sloped hopper and a 12 inch square opening in the bottom. The carts were stored in controlled temperature rooms. The particles were stored at 115° F. for 4 days and then 35° F. for 3 days. The flow time was about 9 sec. and no hammer blows were needed to remove the product.

Example 5

Laboratory Flowability tests for animal feed particles.

A 1000 ml Erlenmeyer flask was filled about 800 ml of animal feed particles. The flask was loosely fitted with a rubber stopper and stored in an oven for 24 hours at 120° F. (summer feed), 100° F. (spring/fall feed) or 80° F. (winter feed). The flask was then placed in the refrigerator for 4 hours. The flask was removed and inverted to pour out the particles. The flask was tapped lightly by hand, if needed.

Animal feed particles flowed out of the flask in less than 20 seconds.

Although the present invention has been described with reference to preferred embodiments, workers skilled in the art will recognize that changes may be made in form and detail without departing from the spirit and scope of the invention.

What is claimed is:

1. A livestock animal feed comprising extruded particles with at least a high melting point fat and a total fat content of at least about 45 percent by weight of the feed,
the particles being porous and the high melting point fat being present in the pores of the particles and coating the exterior surface of the particles such that the particles are flowable and have a dry exterior surface,
wherein the high melting point fat present in the pores of the particles and coating the exterior surface of the particles is palm stearin and has a melting temperature of at least 100° F., the palm stearin coating the exterior surface of the particles comprising about 10 wt % to about 50 wt % of the total fat content.

2. The livestock animal feed of claim 1, wherein the total fat content of the particles is at least 55 percent by weight of the feed.

3. The livestock animal feed of claim 1, further comprising one or more additives selected from the group consisting of: amino acids, dyes, molasses, talc, calcium carbonate, vitamins, minerals, nutraceuticals, and pharmaceuticals.

4. The livestock animal feed of claim 1, further comprising starch in an amount of at least about 20 percent by weight of the feed.

5. The livestock animal feed of claim 1, further comprising protein at about 1 percent to about 30 percent by weight of the feed.

6. A method of feeding dairy cows comprising:
feeding extruded feed particles to dairy cows, the extruded feed particles comprising at least a high melting point fat and a total fat content of at least about 45 percent by weight of the feed,
the extruded feed particles being porous and the high melting point fat being present in the pores of the extruded feed particles and coating the exterior surface of the extruded feed particles such that the extruded feed particles are flowable and have a dry exterior surface,
wherein the high melting point fat present in the pores of the extruded feed particles and coating the exterior surface of the extruded feed particles is palm stearin and has a melting temperature of at least 100° F., the palm stearin coating the exterior surface of the extruded feed particles comprising about 10 wt % to about 50 wt % of the total fat content.

7. The method of claim 6, wherein the extruded feed particles provide at least about 1.2 lbs./day of the high melting point fat while maintaining digestibility.

8. The method of claim 6, wherein the total fat content of the extruded feed particles is at least 55 percent by weight of the feed.

9. The method of claim 6, wherein the high melting point fat has a melting temperature of about 120° F. to about 130° F. during summer months.

10. The method of claim 6, wherein the high melting point fat has a melting temperature of about 100° F. to about 115° F. during winter months.

11. The method of claim 6, wherein the extruded feed particles further comprise one or more additives selected from the group consisting of: amino acids, dyes, molasses, talc, calcium carbonate, vitamins, minerals, nutraceuticals, and pharmaceuticals.

12. The method of claim 6, wherein the extruded feed particles further comprise starch at least about 20 percent by weight of the feed.

13. The method of claim 6, wherein the extruded feed particles further comprise protein at about 1 percent to about 30 percent by weight of the feed.

14. The method of claim 6, wherein the extruded feed particles provide at least about 0.3 lbs. of fat per 1 lb. of dry matter intake.

* * * * *

UNITED STATES PATENT AND TRADEMARK OFFICE
CERTIFICATE OF CORRECTION

| | |
|---|---|
| PATENT NO. | : 11,690,385 B2 |
| APPLICATION NO. | : 16/213903 |
| DATED | : July 4, 2023 |
| INVENTOR(S) | : David C. Weakley and Kent J. Lanter |

It is certified that error appears in the above-identified patent and that said Letters Patent is hereby corrected as shown below:

In the Specification

In Column 13, Line 4, delete ""meal/lb"" and replace with --mcal/lb--

Signed and Sealed this
Twentieth Day of February, 2024

Katherine Kelly Vidal
*Director of the United States Patent and Trademark Office*